(12) United States Patent
Isago et al.

(10) Patent No.: US 6,304,470 B1
(45) Date of Patent: Oct. 16, 2001

(54) POWER SUPPLY DEVICE

(75) Inventors: Tomiyasu Isago; Hiromitsu Ogawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/582,079

(22) PCT Filed: Dec. 24, 1998

(86) PCT No.: PCT/JP98/05884

§ 371 Date: Jul. 17, 2000

§ 102(e) Date: Jul. 17, 2000

(30) Foreign Application Priority Data

Dec. 25, 1997 (JP) .................................... 9-357308

(51) Int. Cl.$^7$ ...................................... H02M 7/00
(52) U.S. Cl. ................................ 363/65; 363/69
(58) Field of Search ..................... 363/65, 66, 67, 363/69, 70, 71

(56) References Cited

U.S. PATENT DOCUMENTS

| 4,860,188 | * | 8/1989 | Bailey et al. | 363/65 |
| 5,612,581 | * | 3/1997 | Kageyama | 363/65 |
| 6,229,723 | * | 5/2001 | Umetsu et al. | 363/71 |

FOREIGN PATENT DOCUMENTS

| 6-105464 | 4/1994 | (JP) . |
| 6-36388 | 5/1994 | (JP) . |
| 9-093931 | 4/1997 | (JP) . |

* cited by examiner

*Primary Examiner*—Jessica Han
(74) *Attorney, Agent, or Firm*—Helfgott & Karas, PC

(57) ABSTRACT

In a power supply device supplying, in parallel, power from a plurality of DC/DC converters to a common load, there is provided an output compensation circuit which is provided on an output side of each of the DC/DC converters and compensates for an output voltage drop due to a voltage drop developing across a diode for parallel operation.

3 Claims, 5 Drawing Sheets

POWER SUPPLY DEVICE

TECHNICAL FIELD

The present invention relates to power supply devices, and more particularly to improvements in an output voltage drop at the time of parallel operation of a DC/DC converter.

BACKGROUND ART

Field of the Invention

FIG. 1 is a diagram showing a configuration of a conventional device. The conventional device is arranged so that a first DC/DC converter 10 (DC/DC converter 1) and a second DC/DC converter 20 (DC/DC converter 2) are connected in parallel with a load via diodes for parallel operation so that power can be supplied to the load.

When a switching element TR1 is ON, an input voltage E is switched by the switching transistor TR1. C1 is a condenser for noise elimination connected across the input voltage E. As shown, an FET is used as the switching element TR1. A primary winding of a power transformer T is connected as a load of the FET. The switching element TR1 is driven by a control part (CONT) 1. For example, PWM (pulse width modulation) is used as a driving method. That is, by controlling the ON time in a clock cycle, the switching element TR1 is controlled so that an output voltage E01 is kept constant.

A high-frequency alternating current introduced on a secondary side of the power transformer T when the switching element TR1 is ON is converted into a direct current voltage by means of a full-wave rectifying circuit made up of diodes D1 and D2. The direct current voltage is applied to a smoothing condenser C2 via a smoothing coil L1, and is regulated so as to be a flat direct current voltage. R1, R2 and R3 are resistors connected between an output line and a common line, and have th function of dividing the output voltage. R4 is a resistor connected between the output line and the common line.

The output voltage supplies power to a load 2 via a diode D3 for parallel operation (parallel connection). The output voltage obtained at that time is divided by the voltage dividing circuit made up of the resistors R1~R3, and a divided voltage is applied to the control part 1 as the output voltage. The control part 1 compares the output voltage with a reference value and controls the ON time of the switching element TR1 so that both the values coincide with each other (PWM control).

When the switching element TR1 is OFF, energy stored in the smoothing coil L1 passes through a loop of smoothing condenser C2→parallel operation diode D3→load 2 →and diode D2, and current is supplied to the load 2.

The foregoing is directed to the operation of the DC/DC converter 1, and an operation of the DC/DC converter 2 is the same as the above. Power (current I0) is supplied to the load 2 by the two DC/DC converters.

In the above-mentioned circuit, it is necessary to add block diodes (diodes for parallel operation) in order to prevent, when one of the DC/DC converters becomes abnormal at the time of parallel operation, the other DC/DC converter from being affected.

In the above-mentioned circuit, power is supplied to the load 2 via the parallel operation diodes D3. Thus, if the load current increases, the voltage drop developing across the diode D3 increases, and the output vs. voltage characteristic obtained at this time is as shown in FIG. 2. As the output current I0 increases, the output voltage E01 is decreased due to the voltage drop developing across the diode D3, and is dropped by ΔV1 about the rated current. Thus, the output voltage at that time becomes as shown in FIG. 2, and a drop of the output voltage may prevent a communication device serving as the load from normally operating.

The present invention is made taking into consideration the above problems, and has an object of providing a parallel operating device of a DC/DC converter capable of suppressing a drop of the output voltage at the time of parallel operation.

DISCLOSURE OF THE INVENTION

The present invention is a power supply device supplying, in parallel, power from a plurality of DC/DC converters to a common load, there is provided an output compensation circuit which is provided on an output side of each of the DC/DC converters and improves an output voltage due to a voltage drop developing across a diode for parallel operation, The above-mentioned output compensation circuit may be constructed so as to be a circuit which improves the output voltage due to the voltage drop developing across the diode for parallel operation, in which: a first diode is connected via a resistor to one end of the diode for parallel operation; a second diode is connected via another resistor to another end of the diode for parallel operation; and yet another resistor is connected between cathodes of the first and second diodes and an output terminal.

The above-mentioned output compensation circuit may be constructed so as to a circuit which detects an increase in an output current and increases a voltage of an anode side of the diode for parallel operation.

BEST MODES FOR CARRYING OUT THE INVENTION

Figure 1:
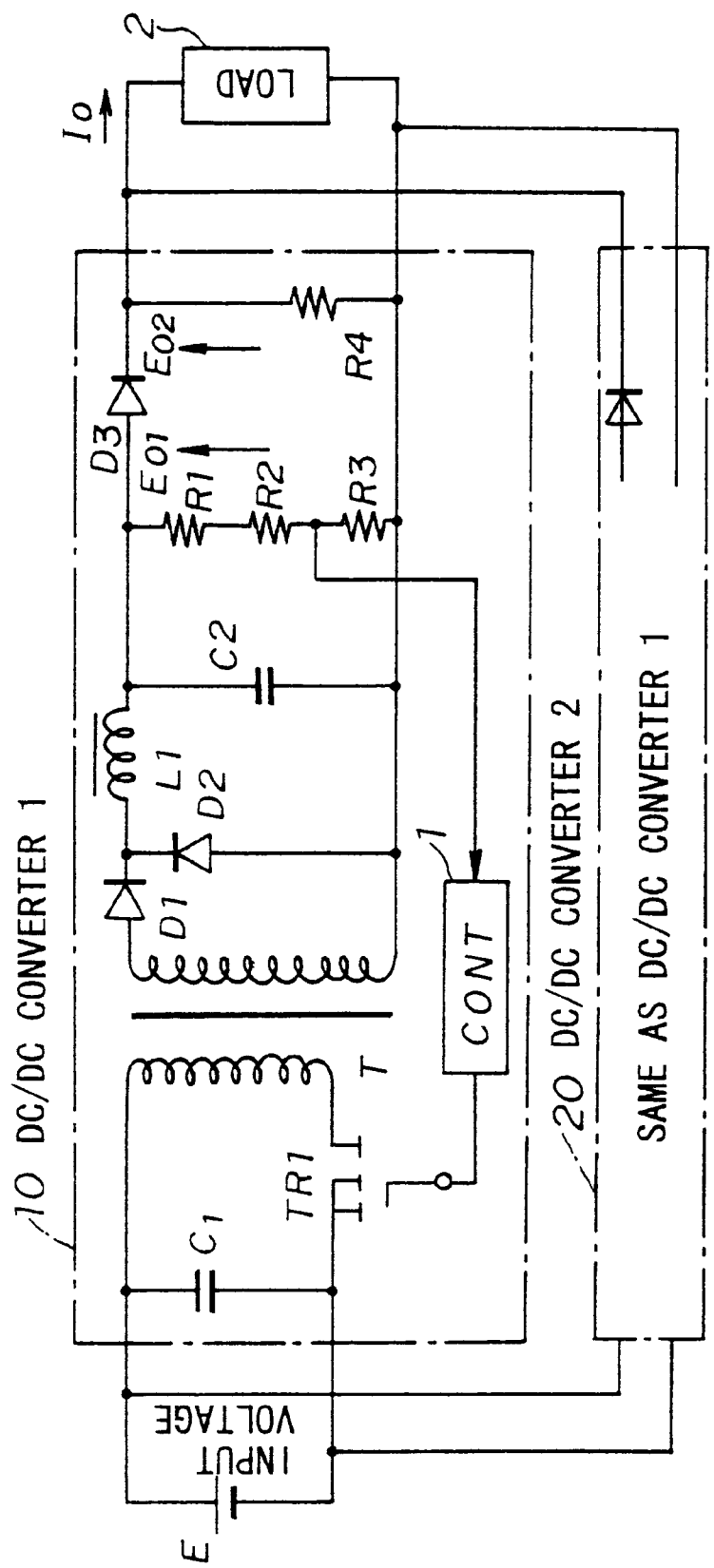
FIG. 1 is a diagram of a configuration of a conventional device.
Figure 3:
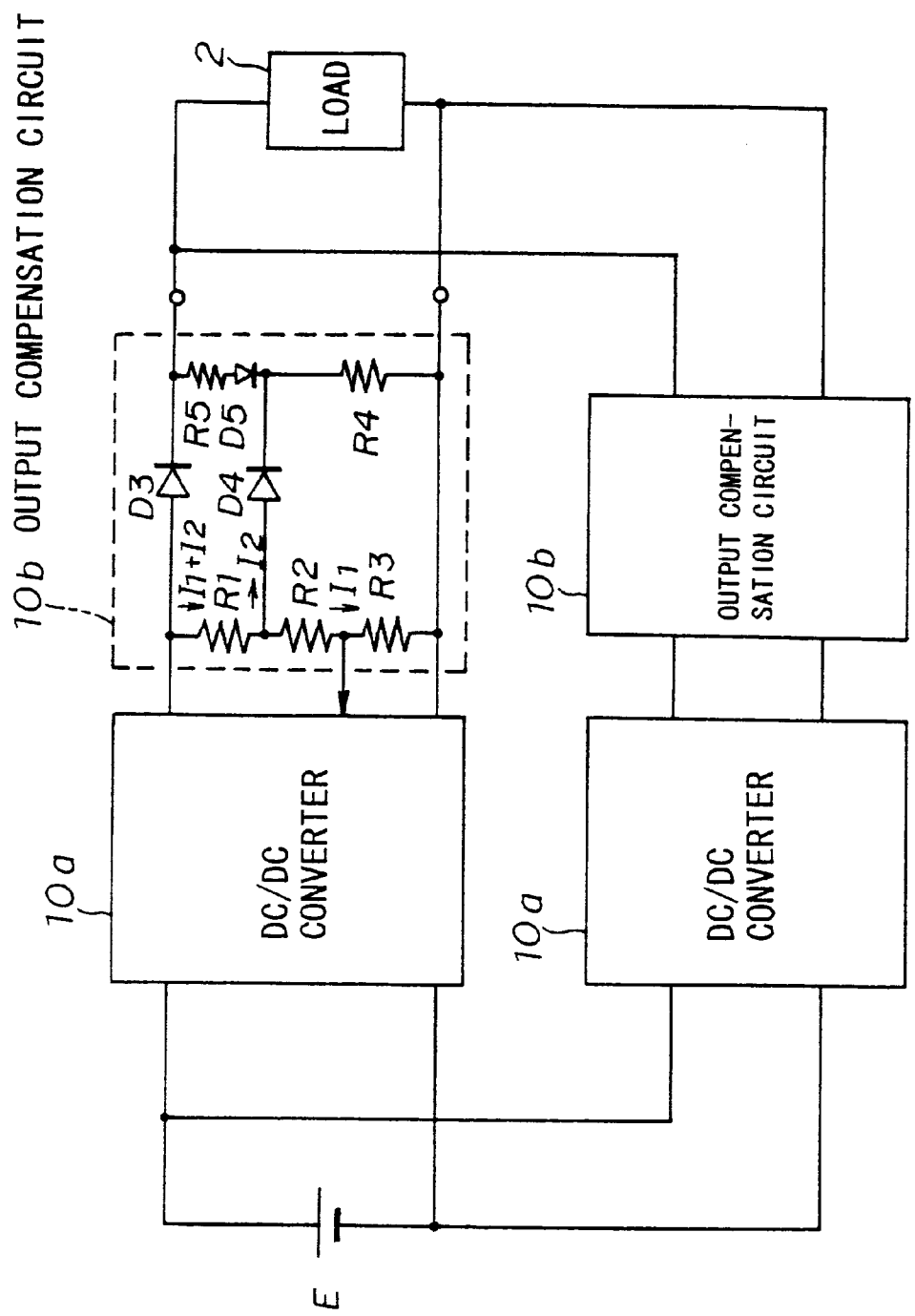
FIG. 3 is a diagram of a principal configuration of the present invention.

FIG. 3 is a diagram of a principal configuration of the present invention, in which parts that are the same as parts shown in FIG. 1 are denoted by the same reference numerals in both figures.

A direct current (input voltage) E is subjected to parallel operation by means of two DC/DC converters, so that power can be supplied to the load 2.

In order to achieve the parallel operation, the diode D3 for parallel operation must be provided. Here, each of the DC/DC converters is separated into a main body 10*a* and an output compensation circuit 10*b*. Each of the output compensation circuits 10*b* is an output compensation circuit which compensates for a voltage drop of the output voltage due to a situation in which the output current 10 flows in the load 2.

Each of the output compensation circuits 10*b* is made up of diodes D4 and D5 and resistors, as shown in FIG. 3 (the detail thereof will be described later).

According to this configuration of the present invention, the output compensation circuits 10*b* compensate for voltage drops developing across the diodes D3 for parallel operation due to the flow of the load currents.

In this case, each of the output compensation circuits 10b is characterized in which it is a circuit for improving the output voltage drop developing across the parallel operation diode. Each output compensation circuit 10b is arranged so that one end of the parallel operation diode D3 is connected to the first diode D4 via the resistor R4, and the other end of the parallel operation diode D3 is connected to the second diode D5 via the resistor R5, and that the cathode of the first diode D4 and the cathode of the second diode D5 are connected together, and the resistor R4 is connected between the cathodes of the first and second diodes and the output terminal.

According to the configuration of the present invention, a current flows in the first diode D4, so that the anode potential of the parallel operation diode D3 can be maintained at a high level enough to suppress a drop of the output voltage occurring at the time of parallel operation.

A description will now be given of an embodiment of the present invention.

Figure 4:
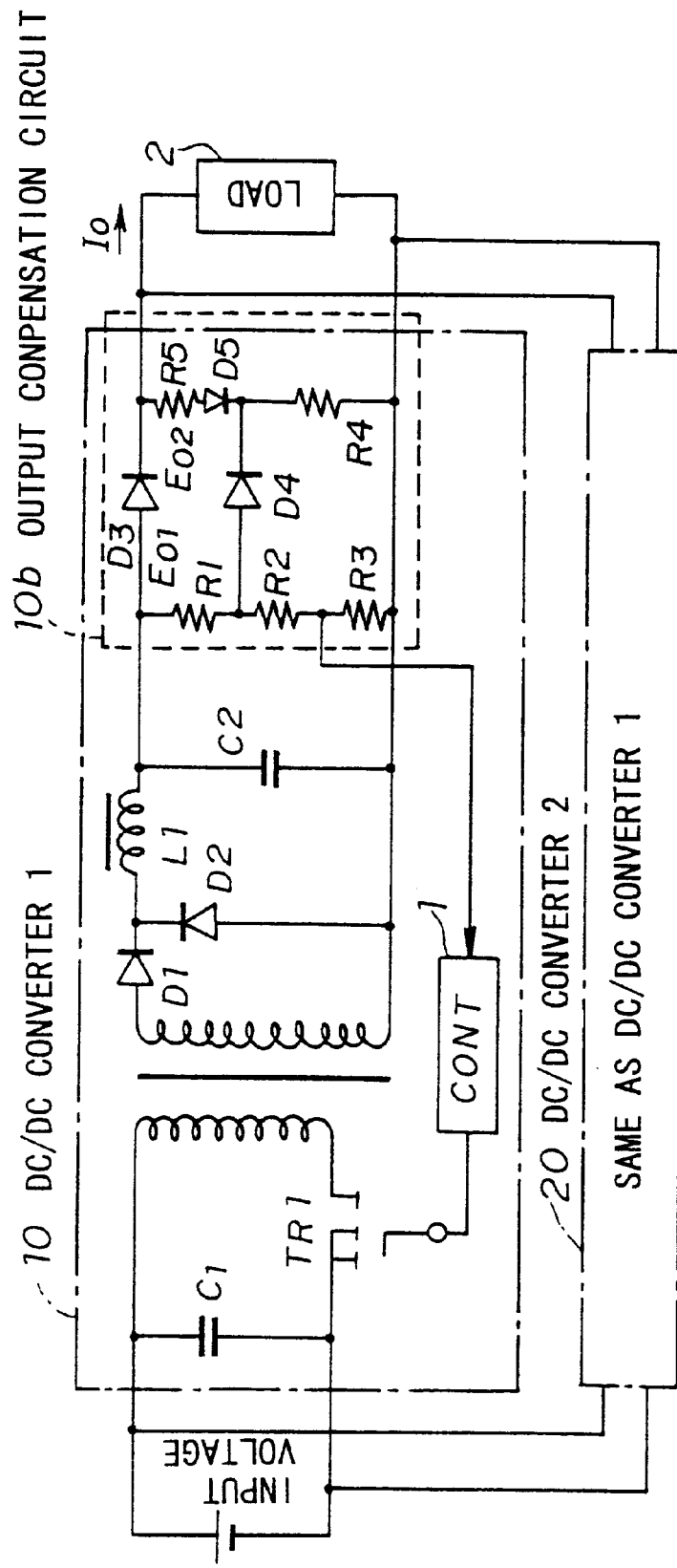
FIG. 4 is a diagram showing an embodiment of the present invention.

FIG. 4 is a diagram showing an embodiment of the present invention, in which a feed-forward type converter is illustrated. Two DC/DC converters operate in parallel, and supply power to the load 2. In the output compensation circuit 10b, D3 is a diode for parallel operation, and D4 is an output voltage compensation diode connected between a connection node at which the resistors R1 and R2 of the divided voltage output resistor circuit and the power output part.

D5 is a diode for preventing a reverse flow of current, and is connected between one end of the resistor R5 of the voltage output part and the cathode of the diode D4. More particularly, the diode D5 prevents the current flowing in the diode D4 from flowing to the load side. The other end of the resistor R4 is connected to the common line. The other configuration is the same as the conventional circuit shown in FIG. 4. The circuit thus configured operates as follows.

(1) Whole Operation

The whole operation is the same as that of the conventional circuit shown in FIG. 4. That is, when the switching element TR1 is ON, the control part 1 controls the ON voltage of the switching element TR1 so that the output voltage can be constant.

When the switching element TR1 is OFF, energy stored in the smoothing coil L supplies power to the load 2.

By repeating ON/OFF of the switching element TR1 thus arranged, the output voltage E02 can be kept constant.

(2) Operation of the Output Compensation Circuit

As the output current I0 increases and the forward voltage drop developing across the parallel operation diode E3, the ratio of the currents flowing in the diodes D4 and D5 is changed so as to compensate for a forward voltage drop developing across the parallel operation diode D3, whereby the drop of the output voltage E02 can be improved.

As the output current I0 increases, the current flowing in the diode D5 is reduced, while the current flowing in the diode D4 is increased. As the current I2 flowing in the diode D4 increases, a voltage drop developing across the resistor R1 is increased, so that the anode voltage E01 of the diode D3 is increased. The voltage E01 is expressed by the following formula:

$$E01 = I1(R1+R2+R3) + I2R1.$$

Thus, the drop of the output voltage E02 can be reduced.

Figure 2:
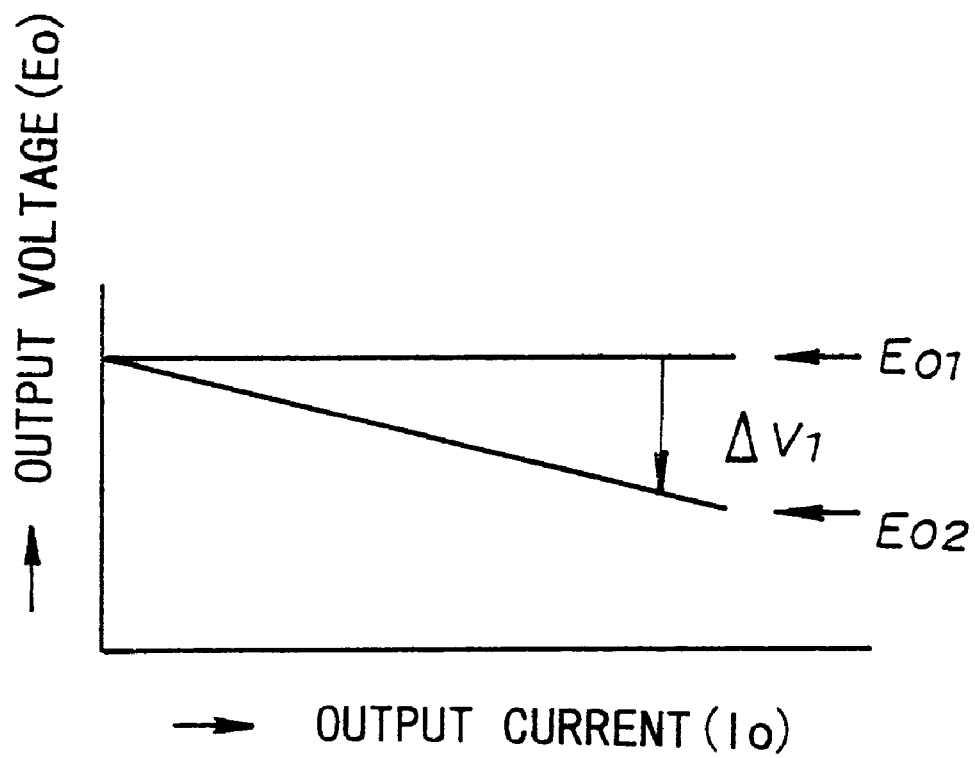
FIG. 2 is a diagram showing an output voltage characteristic of the conventional device.
Figure 5:
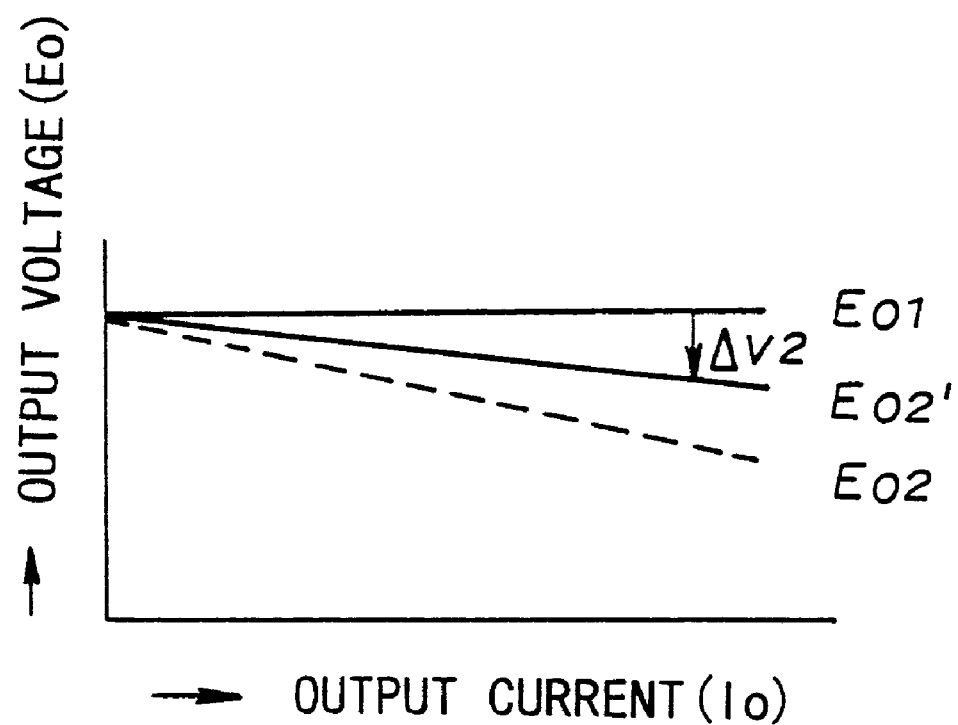
FIG. 5 is a diagram showing an output voltage characteristic of the present invention.

FIG. 5 is a diagram showing an output voltage characteristic of the present invention. The vertical axis denotes the output voltage E02, and the horizontal axis denotes the output voltage I0. E02 shown in FIG. 5 indicates a characteristic of the conventional circuit, and E02' denotes a characteristic of the present invention. It can be seen from comparison with the conventional circuit (see FIG. 2) that the voltage drop $\Delta V2$ is reduced.

The present embodiment is directed to parallel operation using two DC/DC converters. However, the present invention is not limited to the above but includes parallel operation using three or more DC/DC converters.

As described above, according to the present invention, in a power supply device supplying, in parallel, power from a plurality of DC/DC converters to a common load, there is provided an output compensation circuit which is provided on an output side of each of the DC/DC converters and improves an output voltage due to a voltage drop developing across a diode for parallel operation, whereby the output compensation circuit compensates for the voltage drop across the diode for parallel operation caused by a load current, and the voltage drop can thus be suppressed.

In the above case, the output compensation circuit is a circuit which improves the output voltage due to the voltage drop developing across the diode for parallel operation, in which: a first diode is connected via a resistor to one end of the diode for parallel operation; a second diode is connected via another resistor to another end of the diode for parallel operation; and yet another resistor is connected between cathodes of the first and second diodes and an output terminal, whereby current flowing in the first diode functions to keep the anode voltage of the diode for parallel operation high enough to suppress a drop of the output voltage occurring at the time of parallel operation.

Thus, according to the present invention, it is possible to suppress a drop of the output voltage at the time of parallel operation using DC/DC converters.

What is claimed is:

1. A power supply device supplying, in parallel, power from a plurality of DC/DC converters to a common load, said power supply device comprising:

an output compensation circuit which is provided on an output side of each of the DC/DC converters and having a first diode connected through a first resistor to one end of a second diode for parallel operation and said first diode having another end coupled through a second resistor to an output terminal, and compensates for an output voltage drop due to a voltage drop developing across said diode for parallel operation by changing the current flow in said first diode connected to said first resistor.

2. A power supply device supplying, in parallel, power from a plurality of DC/DC converters to a common load, said power supply device comprising:

an output compensation circuit which is provided on an output side of each of the DC/DC converters and compensates for an output voltage drop due to a voltage drop developing across a diode for parallel operation, wherein said output compensation circuit is a circuit which improves the output voltage due to the voltage drop developing across the diode for parallel operation, in which: a first diode is connected via a first resistor to one end of the diode for parallel operation; a second diode is connected via second resistor to another end of the diode for parallel operation; and third resistor is connected between cathodes of the first and second diodes and an output terminal.

3. The power supply device as claimed in claim 1, wherein the output compensation circuit is a circuit which detects an increase in an output current and increases a voltage of an anode side of the second diode for parallel operation.

* * * * *